May 21, 1940.  K. HEINRICH  2,201,829
PROTECTIVE APPARATUS
Filed Dec. 7, 1938
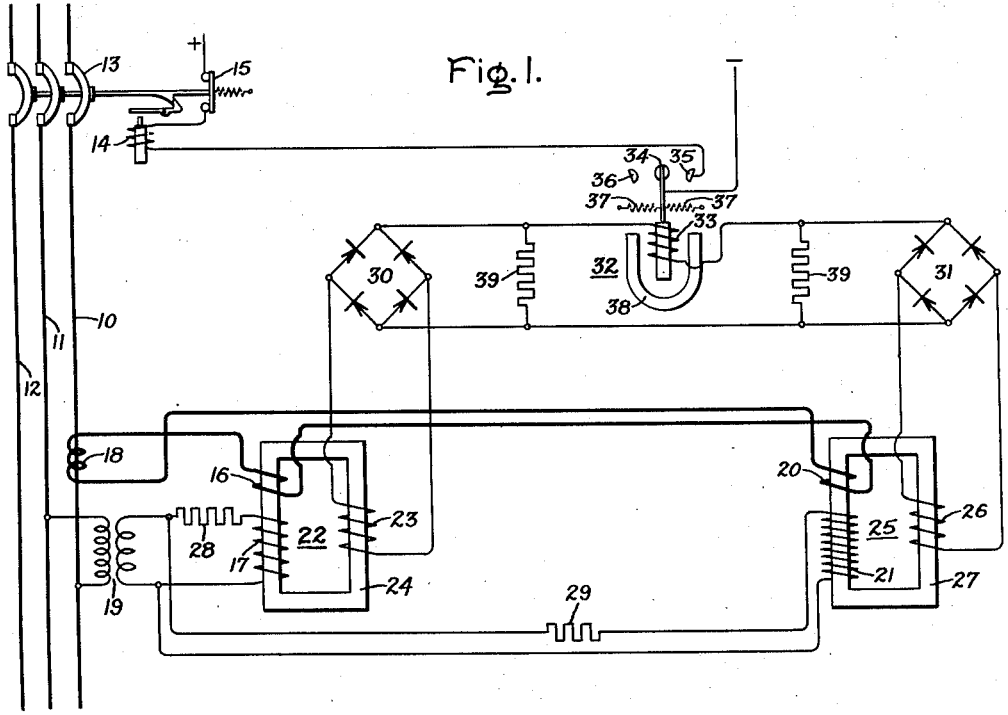
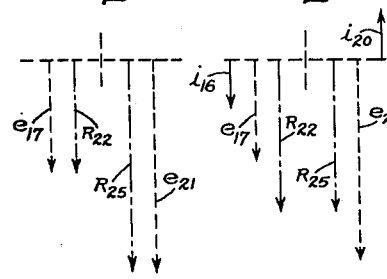
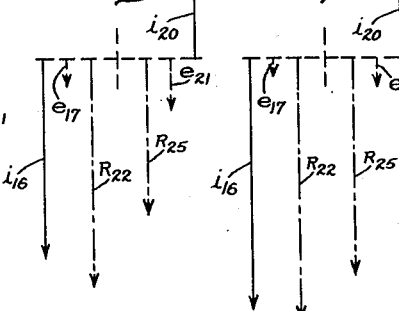
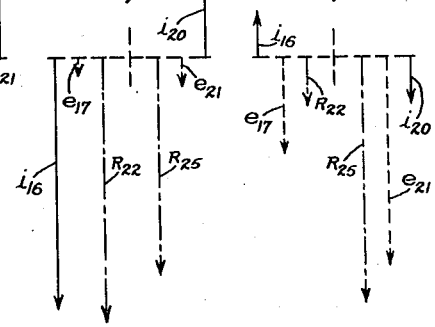
Inventor:
Kurt Heinrich
by Harry E. Dunham
His Attorney.

Patented May 21, 1940

2,201,829

UNITED STATES PATENT OFFICE 2,201,829

PROTECTIVE APPARATUS

Kurt Heinrich, Berlin-Treptow, Germany, assignor to General Electric Company, a corporation of New York Application December 7, 1938, Serial No. 244,462
In Germany December 21, 1937

15 Claims. (Cl. 175—294)

My invention relates to improvements in protective apparatus for electric circuits and more particularly to improvements in fault responsive directional relays and especially relays of the distance type. One object of my invention is to provide an improved differential type of relay which will respond, particularly in case of faults, to a change in the direction of flow of power in a circuit with a strong positive action even though the circuit voltage is greatly reduced. A differential type of directional relay for this purpose is disclosed in U. S. Letters Patent 1,213,835, issued January 30, 1917, and assigned to the assignee of this invention. Another object of my invention is to provide an improved relay device which combines with the foregoing directional response characteristic a suitable distance or impedance response. These and other objects of my invention will appear in more detail hereinafter.

My invention will be better understood from the following description when considered in connection with the accompanying drawing and its scope will be pointed out in the appended claims.

In the accompanying drawing Fig. 1 illustrates diagrammatically an embodiment of my invention, and Figs. 2-6, inclusive, are vector diagrams explanatory of the operation of the embodiment of my invention shown in Fig. 1.

In Fig. 1 my invention is shown for the purpose of illustration as applied to a three-phase alternating current circuit comprising phase conductors 10, 11 and 12. For controlling this circuit, there may be provided suitable circuit interrupting means such as a latch closed circuit breaker 13 having a trip coil 14 and an "a" auxiliary switch 15.

For controlling the circuit breaker 13 so as to effect the opening thereof on the ocurrence of faults in dependence on the direction of flow of fault power and the distance to the fault, I provide in accordance with my invention a relay device comprising a group of two cumulatively acting elements such as windings 16 and 17. These are respectively connected to be energized in accordance with a current and a voltage of the circuit 10, 11, 12, for example the current in phase conductor 10 and the voltage between the phase conductors 10 and 11. For this purpose, there may be provided a current transformer 18 and a potential transformer 19. Furthermore, I provide a group of two oppositely acting elements such as windings 20 and 21 also respectively connected to be energized in accordance with the current in the phase conductor 10 and the voltage between the phase conductors 10 and 11. As shown, the windings 16 and 17 may constitute the primary windings of a transformer 22 having a secondary winding 23, the windings 16 and 17 being so connected and arranged as to provide cumulative fluxes in the core 24 of the transformer 22 for power flow in a given direction in the circuit 10, 11, 12. Likewise, the windings 20 and 21 may constitute the primary windings of a transformer 25 having a secondary winding 26, the windings 20 and 21 being so connected and arranged as to provide oppositely acting fluxes in the core 27 of the transformer 25 for said given direction of power flow. As shown in Fig. 1, the current energized windings 16 and 20 may be similarly wound but oppositely connected, whereas the voltage energized windings 17 and 21 are similarly wound and similarly connected. The windings 16 and 20 may have the same number of turns, but one of the voltage windings 21, for example, has a substantially greater number of turns than the other voltage winding 17.

In general, in accordance with my invention the numbers of turns of the windings 16, 17, 20 and 21 are so proportioned that the fluxes produced in the cores 24 and 27 are substantially equal for a predetermined condition of normal loading of the circuit 10, 11, 12. In order to secure the desired current flow in the potential windings 17 and 21 with their different numbers of turns and consequent different reactances, ballast resistors 28 and 29 respectively may be provided in series with these windings. On the occurrence of faults on the circuit 10, 11, 12, the resultant fluxes of the windings 16 and 17 are different from the resultant fluxes of the windings 20 and 21 by reason of the opposite connection of the windings 16 and 20 and the different numbers of turns in the windings 17 and 21. In accordance with my invention, this flux difference is to be made effective in a suitable relay arrangement one form of which is shown in Fig. 1 and is to be explained hereinafter.

Referring now to Fig. 2 and assuming that the circuit breaker 13 is open but that the circuit 10, 11, 12 has voltage thereon by virtue of its connection to an energized station bus not shown, then the fluxes due to the voltage windings 17, 21 may be represented by the vectors $e_{17}$ and $e_{21}$. The resultant fluxes of the primary windings of the transformers 22 and 25 may be represented by the vectors $R_{22}$ and $R_{25}$ which will be the same as $e_{17}$ and $e_{21}$ respectively since there is no current flowing to energize the current transformer 18 and its connected windings 19 and 20. The difference between these resultant fluxes may be combined in a manner, which will hereinafter be pointed out, to produce a relaying action which may be considered as indicated in magnitude by the difference between the vectors R22 and R25 and in direction by which of these is the greater.

Referring now to Fig. 3 and assuming the normal loading condition for which the fluxes in the two transformers are balanced, as heretofore set forth, and also that the current and voltage are in phase, then the fluxes due to the current windings 19 and 20 may be represented by the vectors $i_{19}$ and $i_{20}$. The resultant fluxes of the transformers 22 and 25 are now balanced, and there would be substantially no difference in the outputs between these transformers and no resultant action in consequence of this zero difference.

Referring now to Fig. 4 and assuming a fault condition causing overcurrent with corresponding decrease in voltage, the resultant fluxes R22 and R25 of the primary windings of the transformers 22 and 25 have a difference which, as will hereinafter be pointed out, may be made effective to cause a relay operation of a different character from that indicated in connection with Fig. 2.

Fig. 5 represents a case of a more severe fault than shown in connection with Fig. 4. In this case the current is larger and the voltage more greatly reduced. The difference between the resultant fluxes R22 and R25 of the transformers 22 and 25, as will be observed, is again in the same direction as in Fig. 4 although the magnitude of the resultant action is somewhat decreased.

Referring now to Fig. 6, it is assumed that a fault condition has occurred causing a reversal of power. Accordingly, the vectors $i_{19}$ and $i_{20}$ are both reversed and the vectors $e_{17}$ and $e_{21}$ reduced in dependence on the severity of the fault. From the resulting flux vectors R22 and R25 of the transformers 22 and 25, it will be apparent that the difference action is similar to that shown in Fig. 2 in so far as the directional effect is concerned but opposite to the effect obtained in connection with the conditions assumed in Figs. 4 and 5.

Inasmuch as there is an evident directional effect dependent on the difference between the resultant primary winding fluxes of the transformers 22 and 25, this difference may be used to obtain a desired relay operation for fault discrimination dependent on the direction of power flow and the distance to the fault. Thus in accordance with my invention, I may connect the secondary windings 23 and 26, which reflect the resultant fluxes R22 and R25, so as to obtain an action dependent on the difference between these fluxes. One way, as shown in Fig. 1, is to connect the windings 23 and 26 to suitable rectifying means shown as full wave rectifiers 30 and 31 in order to use, for example, a sensitive directional relay device such as a polarized relay 32 having an actuating winding 33. In this case, in accordance with my invention, the outputs of the rectifiers are so connected that the effects of the transformers 22 and 25 are opposed. In other words, the difference between the fluxes R22 and R25 is effective in energizing the winding 33 to move a movable contact 34 to engage two or more stationary contacts 35 and 36. The contact 35 may be arranged in the circuit of the trip coil 14 and the connection so arranged that movement of the contact 34 is effected in a direction to engage the contact 35 for power flow in a given direction or under the conditions as shown in Figs. 4 and 5. Under the conditions shown in Figs. 2 and 6, the movable contact 34 will be moved in a direction to engage the contact 36 for any purpose desired or this contact may be a stop. For conditions shown in Fig. 3, where there is no resultant flux difference to effect the winding 33, light centering springs 37 may be used to keep the movable contact 34 from moving under vibrations or the like. The polarized relay is illustrated simply as of the permanent magnet type although the magnet 38 could be an electromagnet as is well known to the art. In order to reduce the burden on the current transformer and thereby minimize the voltage in its secondary shunt resistors 39 are provided.

Although I have shown a relay arrangement for only one phase, the arrangements for the other phases will be apparent to those skilled in the art. Also it will be apparent to those skilled in the art that, if a time graduation based on the usual scheme of stepped time-distance protection is desired, a differential relay device such as shown may be provided for each time graduation. Instead of comparing the resultant fluxes, the voltages could be directly added and compared but in this event the phase displacement between the resultant voltages would not be eliminated as with the embodiment of my invention shown.

While I have shown and described my invention in considerable detail, I do not desire to be limited to the exact arrangements shown, but seek to cover in the appended claims all those modifications that fall within the true spirit and scope of my invention.

What I claim as new and desire to secure by Letters Patent of the United States is:

1. A relay device comprising a group of two normally cumulatively acting flux producing elements, another group of two normally oppositely acting flux producing elements, means for deriving currents respectively dependent on the fluxes established by said two groups of flux producing elements, and means connected to be energized in dependence on the difference between said derived currents.

2. A relay device comprising a group of two normally cumulatively acting flux producing elements, another group of two normally oppositely acting flux producing elements, means for deriving currents respectively dependent on the fluxes established by said two groups of flux producing elements, means for rectifying said derived currents, and means responsive to the difference between the rectified currents.

3. A relay device comprising a group of two normally cumulatively acting flux producing elements, another group of two normally oppositely acting flux producing elements, means for deriving currents respectively dependent on the fluxes established by said two groups of flux producing elements, means for rectifying said derived currents, and a directional relay connected to be energized in accordance with the difference between the rectified currents.

4. In a directional impedance relay device for an alternating current circuit, a transformer having two cumulatively acting primary windings respectively connected to be energized in accordance with a current and a voltage of the circuit and a secondary winding, another transformer having two oppositely acting primary windings respectively connected to be energized in accordance with a current and a voltage of the circuit and a secondary winding, means for rectifying the currents in the secondary windings of said transformers, and directionally responsive means connected to be energized in accordance with the difference between the rectified currents.

5. A relay device comprising a transformer having two cumulatively acting primary windings and a secondary winding, another transformer having two oppositely acting primary windings and a secondary winding, means for rectifying the currents in the secondary windings of said transformers, and means energized responsively to the difference between the rectified currents.

6. A relay device comprising a transformer having two cumulatively acting primary windings and a secondary winding, another transformer having two oppositely acting primary windings and a secondary winding, and means connected to be energized responsively to a predetermined function of the currents in the secondary windings of said transformers.

7. In a directional impedance relay for an alternating current circuit, electromagnetic flux producing means connected and arranged to provide two fluxes respectively proportional to (E+I) and $k$E−I), E and I representing respectively a voltage and a current of the circuit and $k$ a constant exceeding one, and means connected to be controlled in dependence on the difference between said fluxes.

8. In a directional impedance relay for an alternating current circuit, electromagnetic flux producing means connected and arranged to provide two fluxes respectively proportional to (E+I) and ($k$E−I), E and I representing respectively a voltage and a current of the circuit and $k$ a constant exceeding one, and means comprising a directionally responsive device having a winding connected to be energized responsively to the difference between said fluxes.

9. In a directional impedance relay for an alternating current circuit, electromagnetic flux producing means connected and arranged to provide two fluxes respectively proportional to (E+I) and ($k$E−I), E and I representing respectively a voltage and a current of the circuit and $k$ a constant exceeding one, and means comprising a polarized relay having a winding connected to be energized responsively to the difference between said fluxes.

10. In a directional impedance relay for an alternating current circuit, transforming means connected and arranged to provide two currents respectively proportional to different predetermined functions of a current and a voltage of the circuit, and means responsive to the difference between said two currents.

11. In a directional impedance relay for an alternating current circuit, transforming means connected and arranged to provide two currents respectively proportional to different predetermined functions of a current and a voltage of the circuit, means for rectifying said two currents, and means connected to be energized in accordance with the difference between the rectified currents.

12. In a directional impedance relay for an alternating current circuit, transforming means connected and arranged to provide two currents respectively proportional to different predetermined functions of a current and a voltage of the circuit, means for rectifying said two currents, and means comprising a polarized relay having a winding connected to be energized by the difference between the rectified currents.

13. In a directional impedance relay device for an alternating current circuit, a group of two windings respectively energized in accordance with a current and a voltage of the circuit and arranged to assist each other during normal circuit conditions and another group of two windings respectively connected to be energized in accordance with said voltage and said current and arranged to oppose each other during normal circuit conditions, and means controlled responsively to a resultant of the joint effects of the windings of said groups.

14. In a directional impedance relay device for an alternating current circuit, a group of two windings respectively energized in accordance with a current and a voltage of the circuit and arranged to assist each other during normal circuit conditions and another group of two windings respectively connected to be energized in accordance with said voltage and said current and arranged to oppose each other during normal circuit conditions, and means energized in dependence on the difference between the joint effects of the windings of said groups.

15. Means responsive to the relation between two alternating electric quantities comprising means for obtaining two resultant alternating electric quantities respectively dependent on the sum of and the difference between said alternating electric quantities, means for obtaining two unidirectional electric quantities respectively proportional to said resultant alternating electric quantities, and electroresponsive means connected to be controlled in dependence on the difference between said unidirectional electric quantities.

KURT HEINRICH.